US010993442B2

(12) United States Patent
Malec et al.

(10) Patent No.: US 10,993,442 B2
(45) Date of Patent: May 4, 2021

(54) ULTRA-HIGH LOADING GLYPHOSATE CONCENTRATE

(75) Inventors: Andrew D. Malec, Chicago, IL (US); Timothy M. Figley, Hoffman Estates, IL (US); Krista L. Turpin, Loganville, GA (US)

(73) Assignee: STEPAN COMPANY, Northfield, IL (US)

( * ) Notice: Subject to any disclaimer, the term of this patent is extended or adjusted under 35 U.S.C. 154(b) by 1888 days.

(21) Appl. No.: 12/456,567

(22) Filed: Jun. 17, 2009

(65) Prior Publication Data

US 2009/0318294 A1 Dec. 24, 2009

Related U.S. Application Data

(60) Provisional application No. 61/132,502, filed on Jun. 18, 2008.

(51) Int. Cl.
| | | |
|---|---|---|
| *A01N 25/02* | (2006.01) | |
| *A01N 57/02* | (2006.01) | |
| *A01N 57/20* | (2006.01) | |

(52) U.S. Cl.
CPC .............. *A01N 57/02* (2013.01); *A01N 57/20* (2013.01)

(58) Field of Classification Search
CPC combination set(s) only.
See application file for complete search history.

(56) References Cited

U.S. PATENT DOCUMENTS

| | | |
|---|---|---|
| 3,799,758 A | 3/1974 | Franz |
| 3,853,530 A | 12/1974 | Franz |
| 3,977,860 A | 8/1976 | Franz |
| 4,140,513 A | 2/1979 | Prill |
| 4,405,531 A | 9/1983 | Franz |
| 4,481,026 A | 11/1984 | Prisbylla |
| 4,507,250 A | 3/1985 | Bakel |
| 4,528,023 A | 7/1985 | Ahle |
| 5,317,003 A | 5/1994 | Kassebaum et al. |
| 5,454,984 A | 10/1995 | Graubart et al. |
| 5,522,942 A | 6/1996 | Graubart et al. |
| 5,616,535 A | 4/1997 | Bowey et al. |
| 5,656,572 A | 8/1997 | Kuchikata et al. |
| 5,668,085 A | 9/1997 | Forbes et al. |
| 5,668,086 A | 9/1997 | Tadayuki et al. |
| 5,683,958 A | 11/1997 | Berger et al. |
| 5,700,760 A | 12/1997 | Magin et al. |
| 5,703,015 A | 12/1997 | Berger et al. |
| 5,703,016 A | 12/1997 | Magin et al. |
| 5,710,103 A | 1/1998 | Magin et al. |
| 5,750,468 A | 5/1998 | Wright et al. |
| 5,798,310 A | 8/1998 | Toussaint et al. |
| 5,843,866 A * | 12/1998 | Parker et al. ............... 504/360 |
| 5,858,921 A | 1/1999 | Magin et al. |
| 5,863,863 A | 1/1999 | Hasebe et al. |
| 5,888,934 A | 3/1999 | Townson et al. |
| 5,925,681 A | 7/1999 | Crisanti et al. |
| 5,998,332 A | 12/1999 | Sato et al. |
| 6,063,733 A | 5/2000 | Berger et al. |
| 6,117,820 A | 9/2000 | Culter et al. |
| 6,121,199 A | 9/2000 | Berger et al. |
| 6,184,182 B1 | 2/2001 | Gillespie et al. |
| 6,228,807 B1 | 5/2001 | Kuchikata et al. |
| 6,245,713 B1 | 6/2001 | Brinker et al. |
| 6,277,788 B1 | 8/2001 | Wright |
| 6,365,551 B1 | 4/2002 | Wright et al. |
| 6,432,878 B1 | 8/2002 | Brigance |
| 6,451,735 B1 | 9/2002 | Ottaway et al. |
| RE37,866 E | 10/2002 | Wright et al. |
| 6,500,784 B1 | 12/2002 | Mille et al. |
| 6,541,424 B2 | 4/2003 | Roberts et al. |
| 6,645,912 B1 | 11/2003 | Mille et al. |
| 6,645,913 B2 | 11/2003 | Brigance |
| 6,653,257 B2 | 11/2003 | Millie et al. |
| 6,706,666 B2 | 3/2004 | Hasebe et al. |
| 6,767,863 B2 | 7/2004 | Holger |
| 6,849,577 B1 | 2/2005 | Bean et al. |
| 6,881,707 B2 | 4/2005 | Howat et al. |
| 6,887,830 B2 | 5/2005 | Stridde et al. |

(Continued)

FOREIGN PATENT DOCUMENTS

| | | |
|---|---|---|
| EP | 0290416 A | 11/1988 |
| WO | WO 9632839 A | 10/1996 |

(Continued)

OTHER PUBLICATIONS

Monsanto, Roundup Ultra (R) Specimen Label, 2000, pp. 1-16, by C&P Press.
Monsanto, Roundup (R) Ultra Max Specimen Label, Dec. 10, 2001, pp. 1-21.
Monsanto, Roundup Original Max(R) Specimen Label, 2007, pp. 1-27.
Monsanto, Roundup WeatherMax(R) Specimen Label, 2007, pp. 1-23.
International Search Report dated Mar. 9, 2010 in PCT/US2009/003663.
Written Opinion in the International Searching Authority dated Mar. 9, 2010 in PCT/US2009/003663.

*Primary Examiner* — Johann R Richter
*Assistant Examiner* — Danielle Sullivan
(74) *Attorney, Agent, or Firm* — Dilworth IP, LLC

(57) ABSTRACT

This invention relates to a storage stable, aqueous, herbicidal formulation containing an ultra-high concentration of glyphosate in the isopropylamine, potassium or mixed salt form in combination with a surfactant system, to a method of making the formulation, and to a method of treating unwanted vegetation employing the formulation. The surfactant system employed in the concentrate comprises dialkoxylated alkylamine, water miscible solubilizer and amine oxide. The surfactant system unexpectedly permits the formulation of storage stable, ultra-high loaded aqueous glyphosate salt concentrates possessing high or no cloud points.

47 Claims, 3 Drawing Sheets

(56) References Cited

U.S. PATENT DOCUMENTS

| | | |
|---|---|---|
| 6,897,184 B2 | 5/2005 | Kurita et al. |
| 6,992,045 B2 | 1/2006 | Xu et al. |
| 6,992,046 B2 | 1/2006 | Bramati et al. |
| 7,008,904 B2 | 3/2006 | Crockett et al. |
| 7,049,270 B2 | 5/2006 | Lennon et al. |
| 7,060,661 B2 | 6/2006 | Dobson, Sr. et al. |
| 7,135,437 B2 | 11/2006 | Pallas et al. |
| 7,223,718 B2 | 5/2007 | Smiley |
| 7,314,848 B1 | 1/2008 | Killick et al. |
| 7,316,990 B2 | 1/2008 | Tank et al. |
| 2001/0029240 A1 | 10/2001 | Hasebe et al. |
| 2002/0123430 A1 | 9/2002 | Xu et al. |
| 2002/0160917 A1 | 10/2002 | Ottaway et al. |
| 2003/0069139 A1 | 4/2003 | Auda et al. |
| 2003/0087764 A1 | 5/2003 | Pallas et al. |
| 2003/0096708 A1 | 5/2003 | Agbaje et al. |
| 2003/0104943 A1 | 6/2003 | Lennon et al. |
| 2003/0207764 A1 | 11/2003 | Ottaway et al. |
| 2004/0097372 A1 | 5/2004 | Abraham et al. |
| 2005/0026781 A1 | 2/2005 | Wright et al. |
| 2005/0032649 A1 | 2/2005 | Tank et al. |
| 2005/0130842 A1 | 6/2005 | Fleute-Schlachter et al. |
| 2005/0170965 A1 | 8/2005 | Bramati et al. |
| 2005/0239652 A1 | 10/2005 | Crockett et al. |
| 2005/0261130 A1 | 11/2005 | Lennon et al. |
| 2006/0019828 A1* | 1/2006 | Becher .................. A01N 57/20 504/116.1 |
| 2006/0019830 A1 | 1/2006 | Xu et al. |
| 2006/0058193 A1 | 3/2006 | Bramati et al. |
| 2006/0063678 A1 | 3/2006 | Wright et al. |
| 2006/0142161 A1 | 6/2006 | Bean et al. |
| 2006/0148648 A1 | 7/2006 | Crockett et al. |
| 2006/0240985 A1 | 10/2006 | Moreno et al. |
| 2008/0103047 A1 | 5/2008 | Gioia et al. |
| 2008/0261814 A1 | 10/2008 | Zhu et al. |
| 2008/0312083 A1 | 12/2008 | Gioia |
| 2009/0018018 A1 | 1/2009 | Gioia et al. |
| 2009/0209425 A1 | 8/2009 | Zhu et al. |
| 2009/0215626 A1 | 8/2009 | Elsik et al. |

FOREIGN PATENT DOCUMENTS

| | | |
|---|---|---|
| WO | WO 97/36491 | 10/1997 |
| WO | WO 03/059068 A1 | 7/2003 |
| WO | WO 2004/107862 A1 | 12/2004 |
| WO | WO 2006/034426 A1 | 3/2006 |
| WO | WO 2006034459 A | 3/2006 |
| WO | WO 2006/041702 A2 | 4/2006 |
| WO | WO 2006041702 A | 4/2006 |
| WO | WO 2008/105964 A1 | 9/2008 |

\* cited by examiner

ULTRA-HIGH LOADING GLYPHOSATE CONCENTRATE

CROSS-REFERENCE TO RELATED APPLICATIONS

This application claims the benefit of U.S. Provisional Application No. 61/132,502, filed Jun. 18, 2008.

FIELD OF THE INVENTION

This invention relates to a storage stable, aqueous, herbicidal formulation containing an ultra-high concentration of glyphosate salt in combination with a surfactant system, to a method of making the formulation, and to a method of treating unwanted vegetation employing the formulation.

BACKGROUND OF THE INVENTION

N-phosphonomethylglycine, commonly referred to as glyphosate, is well known in the art as a post emergent foliar applied herbicide. When glyphosate formulations are applied to green leaves or stems, glyphosate moves through the plant so the entire plant dies. Glyphosate works by disrupting a plant enzyme, EPSP synthase, involved in the production of amino acids that are essential to plant growth. Since the enzyme is not present in humans or animals glyphosate has very low toxicity to humans or animals.

The free acid form of glyphosate has the following structure:

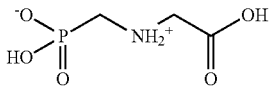

In the free acid form, glyphosate has low water solubility. Accordingly, glyphosate is typically formulated and applied in the form of a water soluble agriculturally acceptable salt. Monobasic, dibasic and tribasic salts of glyphosate can be made, but the monobasic salts are generally preferred. The most widely employed salt of glyphosate is the isopropylamine salt. The salts of glyphosate are generally prepared by partial or complete neutralization of the acid with an appropriate base. Methods for making glyphosate and its salts are known and are disclosed in, e.g., U.S. Pat. Nos. 4,965,403, 4,481,026, 4,405,531, 4,315,765, 4,140,513, 3,977,860, 3,853,530 and 3,799,758, the entire contents of which are incorporated by reference herein for their teachings of such methods. Glyphosate salt formulations are provided in concentrate, dilute (ready to use) and solid (granulate) forms.

Surfactants have been employed as adjuvants in glyphosate salt formulations to enhance herbicidal effectiveness. Surfactants facilitate adherence of the formulations to the surfaces of leaves and thus enhance penetration. The surfactant may be blended with the glyphosate salt in the concentrate or solid forms or may be added by the user to the diluted spray solution. Cationic surfactants, in particular, have found widespread use in glyphosate salt formulations. Examples are long-chain (typically $C_{12}$ to $C_{18}$) tertiary alkylamine surfactants and quaternary alkylammonium surfactants. U.S. Pat. No. 7,135,437 discloses that an especially common tertiary alkylamine surfactant employed in aqueous solution concentrate formulations of glyphosate isopropylammonium salt has been the very hydrophilic surfactant diethoxylated tallowamine having in total about 15 moles of ethylene oxide. The patent further discloses that such surfactants are "highly incompatible" with aqueous solutions of glyphosate potassium salt. The patent cites PCT Publication No. WO 00/15037 for its teaching that alkoxylated alkylamine surfactants possess low compatibility with high-strength glyphosate concentrates in general.

U.S. Pat. No. 5,668,085 describes how it has been found desirable in certain applications to employ somewhat less hydrophilic alkylamine surfactants, such as one having about 8 or fewer alkoxy groups. This patent discloses aqueous compositions comprising such surfactants in combination with the isopropylamine, ammonium or potassium salts of glyphosate. The highest concentration of glyphosate in the potassium salt formulations shown in Table 3 of the patent is 300 g glyphosate salt a.e./l, with a weight ratio of glyphosate a.e. to surfactant of 2:1.

It is advantageous to produce a fully formulated product as quickly as possible for shipment and delivery to the market. For glyphosate formulations, this means that glyphosate acid (N-phosphonomethylglycine) is reacted with base to form the salt and surfactant is thereafter brought into contact with the resulting glyphosate salt formulation. However, the exothermic reaction of glyphosate acid and base releases heat, raising the temperature of the solution to about 75° C. If the surfactant is added to the "hot" glyphosate salt when the temperature of the solution is above the cloud point of the surfactant/glyphosate salt blend the mixture will form two phases with the less dense surfactant phase separating to the top of the vessel, e.g., tank, rail car, which is used to transport the surfactant/glyphosate salt blend. Cloud point is the temperature where a solution first turns cloudy when heated. The cloudiness is the result of the surfactant no longer being soluble in the solution, and thus begins to agglomerate with itself. Left at the temperature where the solution is cloudy, eventually all of the surfactant would agglomerate together and the solution would separate into two layers. To overcome this, one must wait for the reaction product to cool down sufficiently below the cloud point of the final mixture. It is therefore advantageous to provide a glyphosate/surfactant formulation containing a high cloud point (or no cloud point) which would obviate the necessity of waiting for the temperature of the glyphosate salt reaction product to cool down. It is also advantageous to provide a formulation that is stable at low temperatures typically encountered during shipment and storage, particularly during the early spring months when market demand for glyphosate is at its highest.

It is also advantageous to provide formulations wherein glyphosate salt is present in high concentrations. Concentrates containing high loadings of glyphosate salt reduce shipping costs and enable large volumes of dilute spray formulations to be prepared by the end user upon simple addition of water. The solubility of glyphosate potassium salt in water is about 61% by weight, or about 50% by weight glyphosate acid equivalent (a.e.). The solubility of the isopropylamine salt of glyphosate in water is very similar to that of the potassium salt, i.e., about 63% by weight, or about 47% by weight glyphosate acid equivalent. Above these limits of solubility, the formulation turns solid. It can be seen, therefore, that there is a practical upper limit on how high the formulator can go in terms of preparing concentrates having high loadings of glyphosate salt.

It is also advantageous to provide aqueous glyphosate concentrates containing lower concentrations of surfactant compared to industry standards while maintaining similar levels of herbicidal activity as compared to the industry standards. Lower surfactant use levels improve the value proposition for end users, as less surfactant is employed to achieve similar levels of control.

It is generally known in the art that certain commonly employed glyphosate adjuvants exhibit a tendency to cause eye irritancy. For example, it is known that glyphosate formulations containing diethoxylated tallowamine can cause eye irritation. It is advantageous to provide aqueous glyphosate concentrates containing surfactant systems that possess eye irritancy profiles lower than current industry standards.

U.S. Pat. No. 5,710,103 discloses glyphosate formulations containing at least one water-soluble long chain aliphatic hydrocarbyl dimethyl amine oxide and at least one water-soluble quaternary ammonium halide.

WO 2006/041702 discloses ultra-high loaded glyphosate concentrates having cloud points greater than 90° C. comprising glyphosate isopropylamine salt in an amount greater than about 580 g/L a.i., tallowamine alkoxylate and an ethylene diamine alkoxylate.

BRIEF SUMMARY OF THE INVENTION

The present invention is based on the unexpected discovery that surfactant systems comprising dialkoxylated alkylamine, water miscible solubilizer and amine oxide allow for the formulation of ultra-high loaded ("high-strength") glyphosate salt concentrates possessing high or no cloud points. The concentrates of the invention exhibit little or no phase separation at high temperatures, i.e., those greater than about 70° C., and remain optically transparent at such temperatures. The inventors have surprisingly found this to be the case not only with the isopropylamine salts, but also with the difficult-to-formulate potassium salts, as well as mixed salt systems containing the potassium and isopropylamine salts of glyphosate and mixed salt systems containing the potassium and ammonium salts of glyphosate. The components of the surfactant system may be added individually in any order or as a blend to a "hot" glyphosate salt reaction product formed by reaction of glyphosate acid with base. In general, the temperature of the "hot" glyphosate salt reaction product will initially be above 70° C., and in some cases be above about 75° C. or about 80° C., depending on reaction conditions. Thus, the surfactant system disclosed herein allows for continuous blending of the glyphosate salt and surfactant, thus eliminating the wasteful step of waiting for the reaction product to cool and resulting in much more efficient production and cycle times.

The surfactant system employed in the present invention provides a high degree of herbicidal effectiveness, in some cases even at concentrations lower than commercial standards. The concentrates of the invention are stable at low temperatures and also possess low eye irritancy compared to commercial standards.

The present invention provides an ultra-high loading, aqueous glyphosate salt-containing concentrate comprising:
 water;
 glyphosate salt in solution in the water in an amount greater than about 39 weight percent of acid equivalent, based on the weight of the concentrate, said glyphosate salt being selected from the group consisting of the isopropylamine salt of glyphosate, the potassium salt of glyphosate, mixtures of the isopropylamine salt and the potassium salt of glyphosate, and mixtures of the potassium salt and the ammonium salt of glyphosate; and
 a surfactant system in an amount ranging from about 1 to about 20 weight percent, based on the weight of the concentrate, comprising:
  i. from about 10 to about 60 weight percent, based on the weight of the surfactant system, of one or more dialkoxylated alkylamines;
  ii. from about 5 to about 30 weight percent, based on the weight of the surfactant system, of one or more water miscible solubilizers; and
  iii. from about 30 to about 75 weight percent, based on the weight of the surfactant system, of one or more amine oxides;
said concentrate having a cloud point above at least 70° C. or no cloud point when the concentrate is heated to its boiling point.

Further in accordance with the present invention, a method of controlling unwanted vegetation is provided which comprises applying to the vegetation a water-diluted composition of the glyphosate salt-containing concentrate.

Further in accordance with the present invention, a method of making a glyphosate salt-containing composition is provided which comprises:
 (a) providing a glyphosate salt-containing reaction product wherein said glyphosate salt is selected from the group consisting of the isopropylamine salt of glyphosate, the potassium salt of glyphosate, mixtures of the isopropylamine salt and the potassium salt of glyphosate and mixtures of the potassium salt and the ammonium salt of glyphosate; and
 (b) contacting the reaction product with a surfactant system while the temperature of said reaction product is at least 70° C. to provide a glyphosate salt-containing composition which possesses a cloud point above at least 70° C. or no cloud point when the composition is heated to its boiling point, said surfactant system comprising:
  i. from about 10 to about 60 weight percent, based on the weight of the surfactant system, of one or more dialkoxylated alkylamines;
  ii. from about 5 to about 30 weight percent, based on the weight of the surfactant system, of one or more water miscible solubilizers; and
  iii. from about 30 to about 75 weight percent, based on the weight of the surfactant system, of one or more amine oxides.

The glyphosate salt-containing reaction product may be formed in accordance with well known methods by contacting glyphosate acid and base under exothermic glyphosate salt-forming reaction conditions. The surfactant system disclosed herein obviates the requirement that the reaction product first be allowed to cool down prior to addition of surfactant to the reaction product and thus allows for the more efficient production of glyphosate concentrates on a commercial scale.

DETAILED DESCRIPTION OF THE INVENTION

Figure 1:
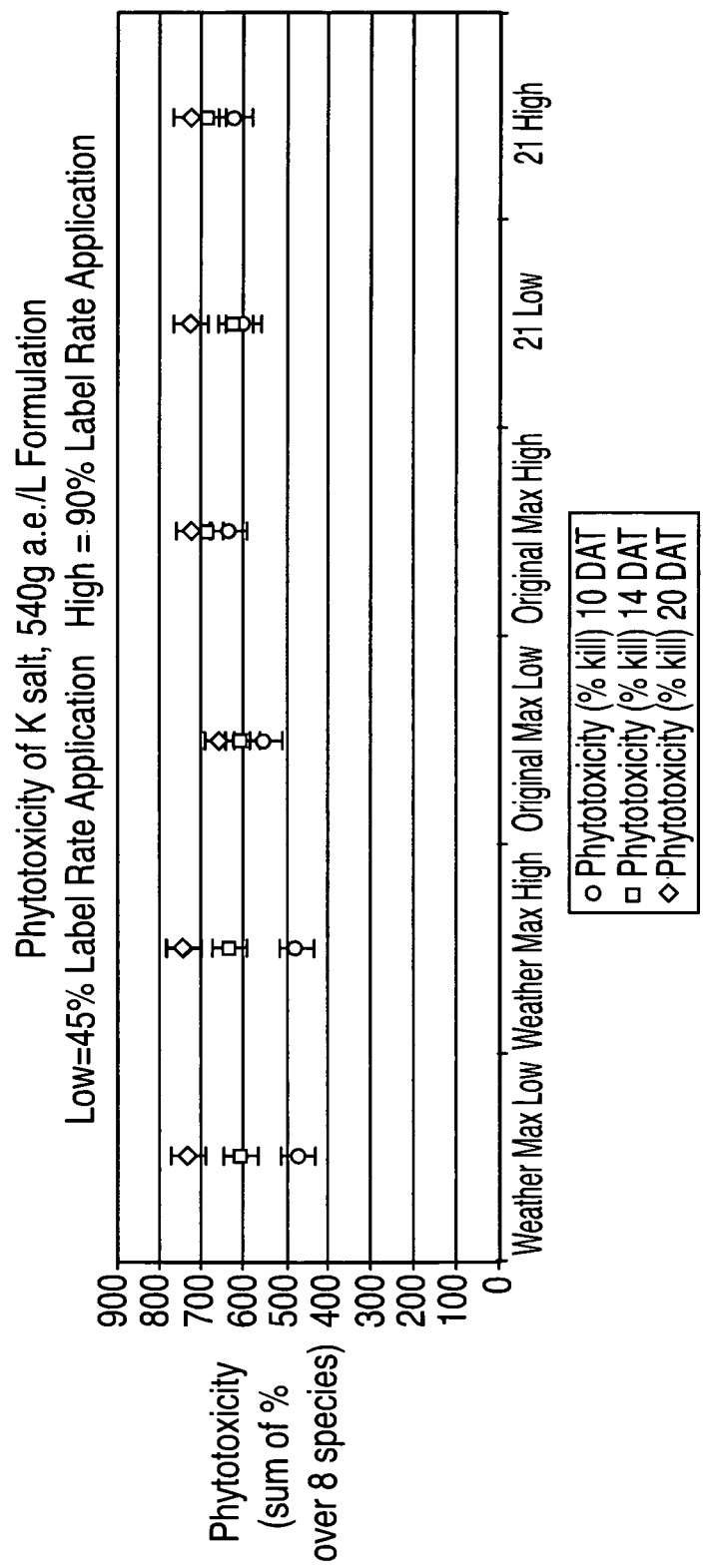
FIGS. 1-3 graphically depict phytotoxicity of herbicides obtained from concentrates of the invention versus those of commercially available products for 8 species of plants. These data demonstrate that the concentrates of the invention provide phytotoxicity comparable or superior to commercial standard formulations.

The glyphosate salt employed in the concentrate and method of the invention refers to the isopropylamine salt of glyphosate, the potassium salt of glyphosate, mixtures of the isopropylamine salt and the potassium salt of glyphosate and mixtures of the potassium salt and the ammonium salt of glyphosate. The isopropylamine and potassium salts are preferred. Insofar as the mixtures of salts are concerned, the salts may be combined in a weight ratio ranging from about 1:10 to about 10:1, particularly from about 1:5 to about 5:1, more particularly from about 1:2 to about 2:1. The identities and methods for the preparation of glyphosate salts are well known and are reported in the literature. See, e.g., U.S. Pat. No. 3,799,758 which describes amine salts and alkali metal salts of glyphosate, and the production of glyphosate by such methods as the phosphonomethylation of glycine, the reaction of ethyl glycinate with formaldehyde and diethylphosphite, and the oxidation of the corresponding aminophosphinic compounds. Another method involves conducting a Mannich reaction with phosphorous acid and formaldehyde on iminodiacetic acid followed by controlled oxidation to N-phosphonomethylglycine. The patent literature contains numerous additional references to various other methods for the production of glyphosate. See, e.g., U.S. Pat. Nos. 4,851,159, 4,898,972, 4,937,376, 4,952,723, 5,061,820, 5,072,033, 5,023,369, 4,853,159 and 5,047,579 as well as relevant references cited in these patents. U.S. Pat. No. 4,965,403 describes a process for producing the alkali metal salts of glyphosate.

The concentrate includes the glyphosate salt in an amount sufficient to provide the high-strength formulation, i.e., in an amount greater than about 39, particularly greater than about 43, more particularly greater than about 47, weight percent of acid equivalent, based on the weight of the concentrate. Stated differently, the concentrate includes greater than about 500 g a.e./l based upon the glyphosate acid equivalent of the glyphosate salt; particularly, the concentrate includes greater than about 550 g a.e./l based upon the glyphosate acid equivalent of the glyphosate salt; more particularly, the concentrate includes greater than about 600 g a.e./l based upon the glyphosate acid equivalent of the glyphosate salt.

The present invention provides an ultra-high loading glyphosate concentrate that is storage stable at high temperatures. The concentrate of the present invention possesses a cloud point of at least 70° C., and is therefore stable at temperatures above 70° C. That is, the concentrate forms a clear, homogeneous, stable solution that does not exhibit cloudiness during production and under storage conditions. In certain embodiments, the concentrates of the invention possess no cloud points, i.e., they boil as clear liquids, or possess cloud points above 100° C., 90° C. or 80° C.

Furthermore, the concentrate of the invention does not exhibit separation or precipitation (or crystallization) of any of the components at low temperatures. For example, the high-strength formulation remains a clear solution at temperatures below about 10° C., particularly at temperatures below about 0° C., for up to 7 days.

Therefore, one important embodiment of the invention is a method of making a glyphosate salt-containing composition which comprises:
(a) providing a glyphosate salt-containing reaction product wherein said glyphosate salt is selected from the group consisting of the isopropylamine salt of glyphosate, the potassium salt of glyphosate, mixtures of the isopropylamine salt and the potassium salt of glyphosate and mixtures of the potassium salt and the ammonium salt of glyphosate; and
(b) contacting the reaction product with a surfactant system while the temperature of said reaction product is at least 70° C. to provide a glyphosate salt-containing composition which possesses a cloud point above at least 70° C. or no cloud point when the composition is heated to its boiling point, said surfactant system comprising:
i. from about 10 to about 60 weight percent, based on the weight of the surfactant system, of one or more dialkoxylated alkylamines;
ii. from about 5 to about 30 weight percent, based on the weight of the surfactant system, of one or more water miscible solubilizers; and
iii. from about 30 to about 75 weight percent, based on the weight of the surfactant system, of one or more amine oxides.

In accordance with a preferred embodiment, the glyphosate salt-containing composition resulting from the practice of the method of the invention is preferably a concentrate of the present invention, i.e., one containing glyphosate in an amount greater than about 39, particularly greater than about 43, more particularly greater than about 47, weight percent of acid equivalent, based on the weight of the concentrate.

The surfactant systems employed in the concentrate and method of the invention comprise dialkoxylated alkylamine, water miscible solubilizer and amine oxide. In general, the weight ratio of glyphosate a.e. to surfactant system will range from about 99:1 to about 5:1, particularly from about 50:1 to about 5:1, more particularly from about 20:1 to about 10:1. Additional surfactants may be optionally employed in the surfactant systems provided they do not deleteriously lower the cloud point of the resulting concentrate to below 70° C. or significantly lower herbicidal effectiveness of the formulation. Additional surfactants include, e.g., betaines, quaternary ammonium compounds, primary or secondary alcohol ethoxylates, alkyl esters of sucrose or sorbitan and alkyl polyglucosides. When such an additional surfactant is present, it is preferable that such additional surfactant represent no more than about 10, particularly no more than about 5, more particularly no more than about 2, weight percent of the surfactant system, based on the entire weight of the surfactant system.

The dialkoxylated alkylamine employed in the present invention corresponds to the formula $R^1$—$N(R^2)(R^3)$ wherein $R^1$ is a $C_8$-$C_{24}$, particularly a $C_{12}$-$C_{18}$ straight or branched chain, saturated or unsaturated hydrocarbyl group, $R^2$ is an $(AO)_nH$ group and $R^3$ is an $(AO)_{n'}H$ group wherein A represents an alkylene group having 2 or 3 carbon atoms and n and n' are integers such that n+n' has an average value of from 2 to 20, particularly from 2 to 15, and more particularly from 5 to 15. Preferably, the dialkoxylated alkylamine is a diethoxylated derivative of cocoamine, tallowamine or oleylamine. The diethoxylated tallowamines are presently preferred. Suitable commercially available dialkoxylated alkylamines include Toximul TA-6, Toximul TA-10 and Toximul TA-15, available from Stepan Company.

Dialkoxylated alkylamines may form a gel phase when mixed with water. The water miscible solubilizer prevents the formation of a gel phase and enhances the solubility of the dialkoxylated alkylamine in the formulation. The water miscible solubilizer employed in the present invention is not particularly limited and may be selected from the group consisting of monohydric alcohol, dihydric alcohol, polyhydric alcohol, alkylene glycol, polyalkylene glycol, and mixtures thereof. Polyalkylene glycols having a molecular weight ranging from about 50 to about 1000, particularly from about 100 to about 600, more particularly from about 200 to about 400, are presently preferred. Such compounds are well known commercially, e.g., Carbowax PEG 200 from Dow Chemical.

Amine oxides useful in the present invention may be represented by the general formula $R^4R^5R^6N{\rightarrow}O$ wherein $R^4$ is a $C_8$-$C_{24}$, particularly a $C_{12}$-$C_{18}$ straight or branched chain, saturated or unsaturated hydrocarbyl group, such as lauryl, decyl, cetyl, oleyl, stearyl and hexadecyl, or a $R^7CONH(CH_2)_n$ group, wherein $R^7$ is a $C_8$-$C_{24}$, particularly a $C_{12}$-$C_{18}$ straight or branched chain, saturated or unsaturated hydrocarbyl group and n is from 1 to 3; $R^5$ and $R^6$ are independently $C_1$-$C_3$ hydrocarbyl groups such as methyl, ethyl, propyl or substituted $C_1$-$C_3$ hydrocarbyl groups such as hydroxyethyl, hydroxyethoxyethyl and hydroxy polyethoxyethyl. Examples of suitable tertiary amine oxides include coconut dimethyl amine oxide, capric/capryllic dimethyl amine oxide, capric dimethyl amine oxide, lauryl dimethyl amine oxide, lauryl/myristyl dimethyl amido propyl amine oxide, and coco dimethyl amido propyl amine oxide. Suitable amine oxides are available commercially under the tradenames Ammonyx LD, Ammonyx CO, Ammonyx DO, Ammonyx 810 DO, Ammonyx MO, and Ammonyx LMDO, all from Stepan Company.

The components of the surfactant system may be added to glyphosate salt in any suitable manner, e.g., individually in any order, or as a preblend. Overall, the surfactant system represents from about 1 to about 20, particularly from about 2 to about 10, more particularly from about 3 to about 8, weight percent of the concentrate, based on the total weight of the concentrate. The dialkoxylated alkylamine represents from about 10 to about 60, particularly from about 25 to about 45, weight percent of the surfactant blend; the water miscible solubilizer represents from about 5 to about 30, particularly from about 10 to about 20, weight percent of the surfactant blend; and the amine oxide represents from about 30 to about 75, particularly from about 40 to about 50, weight percent of the surfactant blend (the weight percents being expressed as a percentage of the total weight of the surfactant actives excluding water). Particularly good results have been obtained herein using an approximately 2:1:2 weight ratio of dialkoxylated alkylamine to water miscible stablizer to amine oxide, e.g., about 40 weight percent dialkoxylated alkylamine, about 20 weight percent water miscible solubilizer and about 40 weight percent amine oxide. In accordance with a preferred embodiment, the surfactant system is a blend comprising diethoxylated tallowamine, polyethylene glycol and lauryl dimethylamine oxide.

In addition to glyphosate salt and the surfactant system, any of a variety of further ingredients or agriculturally acceptable adjuvants may be included in the concentrates of the present invention, as long as such added materials do not lower the cloud point to below 70° C. or significantly lower the herbicidal activity of the formulation. Agriculturally acceptable adjuvants commonly used in formulated agricultural products include, e.g., antifoam agents, compatibilizing agents, sequestering agents, neutralizing agents and buffers, corrosion inhibitors, dyes, odorants, penetration aids, wetting agents, spreading agents, dispersing agents, thickening agents, freeze point depressants, antimicrobial agents, crop oil, other biologically and/or agriculturally active components, and the like.

Other herbicides besides glyphosate salt may be employed in the concentrate of the present invention. Examples of such other herbicides include bialaphos, glufosinate, 2,4-D, MCPA, dicamba, diphenylethers, imidazolinones and sulfonylureas.

Methods of use of glyphosate formulations are well known to those of skill in the art. The high-load glyphosate concentrates of the invention are diluted in an appropriate volume of water and applied, for example by spraying, to the weeds or other unwanted vegetation to be killed or controlled. For most purposes, concentrates of the invention are diluted and applied at glyphosate a.e. rates in the range from about 0.1 to about 5 kg/ha, occasionally more. Typical glyphosate a.e. rates for control of annual and perennial grasses and broadleaves are in the range from about 0.3 to about 1.5 kg/ha. Compositions of the invention may be applied in any convenient volume of water, most typically in the range of from about 50 to about 1000 l/ha.

All patent documents cited above are hereby incorporated by reference in their entirety.

One skilled in the art will recognize that modifications may be made in the present invention without deviating from the spirit or scope of the invention. The invention is illustrated further by the following examples which are not to be construed as limiting the invention or scope of the specific procedures described herein.

EXAMPLES

Preparation of Glyphosate Salt

The general procedures for making glyphosate salt utilized in the following examples were as follows:

a. Isopropylamine salt: 48.9 grams of glyphosate acid (96%, Sinon USA Inc.) was added to 500 mL beaker placed in an ice water bath. 33.7 grams of deionized water (house purified) was added to the glyphosate acid with mixing to create a slurry of glyphosate acid in water. 17.4 grams of isopropylamine (99.5%+, Sigma-Aldrich) was added slowly to this mixture while stirring to generate 100 grams of glyphosate IPA salt concentrate, 46.9% acid equivalents.

b. Potassium salt: 52.1 grams of glyphosate acid (96%, Sinon USA Inc.) was added to 500 mL beaker placed in an ice water bath. 28.7 grams of deionized water (house purified) was added to the glyphosate acid with mixing to create a slurry of glyphosate acid in water. 19.2 grams of potassium hydroxide (86.6%+, Sigma-Aldrich) was added slowly to this mixture while mixing to generate 100 grams of glyphosate K salt concentrate, 50.0% acid equivalents.

c. Mixed potassium and isopropylamine salts: 46.9 grams of glyphosate acid (96%, Sinon USA Inc.) was added to 500 mL beaker placed in an ice water bath. 38.4 grams of deionized water (house purified) was added to the glyphosate acid with mixing to create a slurry of glyphosate acid in water. 6.9 grams of potassium hydroxide (86.6%+, Sigma-Aldrich) was added slowly to this mixture while mixing. Next, 7.8 grams of isopropylamine (99.5%+, Sigma-Aldrich) was slowly added to this mixture while mixing to generate 100 grams of glyphosate K/IPA salt concentrate, 45.0% acid equivalents.

d. Mixed potassium and ammonium salts: 38.5 grams of glyphosate acid (96%, Sinon USA Inc.) was added to 500 mL beaker placed in an ice water bath. 40.8 grams of deionized water (house purified) was added to the glyphosate acid with mixing to create a slurry of glyphosate acid in water. 6.9 grams of potassium hydroxide (86.6%+, Sigma-Aldrich) was added slowly to this mixture while mixing. Next, 13.8 grams of ammonium hydroxide (28-30% ammonia, Sigma-Aldrich) was slowly added to this mixture while mixing to generate 100 grams of glyphosate K/NH4 salt concentrate, 36.9% acid equivalents.

Preparation of Surfactant System

Surfactant systems were prepared by blending diethoxylated tallowamine having an average of n moles of ethylene oxide (TA-n) with polyethylene glycol as solubilizer having an average molecular weight of about 200 (PEG 200) followed by an amine oxide. The surfactant systems are set forth in Table I below.

TABLE I

| Surfactant System | TA-6* (g) | TA-10* (g) | TA-15* (g) | PEG-200 (g) | Water (g) | AO** (g) | LMDO** | 810 DO** | DO** | CDO** |
|---|---|---|---|---|---|---|---|---|---|---|
| A | 40 | 0 | 0 | 20 | 0 | 40 | 0 | 0 | 0 | 0 |
| B | 0 | 0 | 40 | 20 | 0 | 40 | 0 | 0 | 0 | 0 |
| C | 40 | 0 | 0 | 20 | 40 | 0 | 0 | 0 | 0 | 0 |
| D | 0 | 0 | 40 | 20 | 40 | 0 | 0 | 0 | 0 | 0 |
| E | 2 | 0 | 0 | 4 | 0 | 14 | 0 | 0 | 0 | 0 |
| F | 5 | 0 | 0 | 4 | 0 | 11 | 0 | 0 | 0 | 0 |
| G | 4 | 0 | 0 | 2 | 0 | 14 | 0 | 0 | 0 | 0 |
| H | 6 | 0 | 0 | 3 | 0 | 11 | 0 | 0 | 0 | 0 |
| I | 7.7 | 0 | 0 | 3.3 | 0 | 9 | 0 | 0 | 0 | 0 |
| J | 0 | 8 | 0 | 4 | 0 | 8 | 0 | 0 | 0 | 0 |
| K | 0 | 2 | 0 | 4 | 0 | 14 | 0 | 0 | 0 | 0 |
| L | 0 | 5 | 0 | 4 | 0 | 11 | 0 | 0 | 0 | 0 |
| M | 0 | 7 | 0 | 3 | 0 | 10 | 0 | 0 | 0 | 0 |
| N | 0 | 7.5 | 0 | 3 | 0 | 9.5 | 0 | 0 | 0 | 0 |
| O | 0 | 7.5 | 0 | 2.8 | 0 | 9.7 | 0 | 0 | 0 | 0 |
| P | 1 | 0 | 0 | 0.5 | 0 | 0 | 0 | 1 | 0 | 0 |
| Q | 0 | 1 | 0 | 0.5 | 0 | 0 | 0 | 1 | 0 | 0 |
| R | 0 | 0 | 1 | 0.5 | 0 | 0 | 0 | 1 | 0 | 0 |
| S | 1 | 0 | 0 | 0.5 | 0 | 0 | 1 | 0 | 0 | 0 |
| T | 0 | 1 | 0 | 0.5 | 0 | 0 | 1 | 0 | 0 | 0 |
| U | 0 | 0 | 1 | 0.5 | 0 | 0 | 1 | 0 | 0 | 0 |
| V | 1 | 0 | 0 | 0.5 | 0 | 0 | 0 | 0 | 1 | 0 |
| W | 0 | 1 | 0 | 0.5 | 0 | 0 | 0 | 0 | 1 | 0 |
| X | 0 | 0 | 1 | 0.5 | 0 | 0 | 0 | 0 | 1 | 0 |
| Y | 1 | 0 | 0 | 0.5 | 0 | 0 | 0 | 0 | 0 | 1 |
| Z | 0 | 1 | 0 | 0.5 | 0 | 0 | 0 | 0 | 0 | 1 |
| AA | 0 | 0 | 1 | 0.5 | 0 | 0 | 0 | 0 | 0 | 1 |

*TA-6 is Toximul TA-6, TA-10 is Toximul TA-10, TA-15 is Toximul TA-15, all from Stepan Company
**AO is Ammonyx LO (lauryl dimethyl amine oxide), LMDO is Ammonyx LMDO (lauryl/myristyl dimethyl amido propyl amine oxide), 810 DO is Ammonyx 810 DO (capric/capryllic dimethyl amine oxide), DO is Ammonyx DO (capric dimethyl amine oxide), and CDO is Ammonyx CDO (coco dimethyl amidopropyl amine oxide), all from Stepan Company Preparation of Ultra-high Load Glyphosate Concentrates Glyphosate concentrates set forth in Tables IIa-IIb were prepared by taking a concentrated aqueous solution of a given salt of glyphosate produced by the procedure set forth above, adding water with stirring (in certain examples), and adding the surfactant system set forth in Table I with stirring to yield a glyphosate concentrate having a desired concentration of glyphosate and surfactant system. Cloud point readings were taken by placing approximately 25 grams of the concentrate in an appropriate container with a stir bar. The lid of the container was equipped with an adapter that accommodated a thermometer. The solution was then heated with stirring and the temperature at which the solution first became cloudy was noted as the cloud point of the formulation. It can be seen from the data in Table IIa-IIb that concentrates of the invention possess very high loadings of glyphosate salt and high cloud points.

TABLE IIa

| Concentrate Example No. | IPA Glyphosate Salt (g) | K Glyphosate Salt (g) | K/IPA (40:60) Glyphosate Salt (g) | K/NH$_4$ (45:55) Glyphosate Salt (g) | Water (g) | Surfactant System, Amount (g) | Weight Percent Glyphosate Salt | Weight Percent Surfactant Blend | Cloud Point (° C.) |
|---|---|---|---|---|---|---|---|---|---|
| 1 | 45 | 0 | 0 | 0 | 0 | A, 5 | 90 | 10 | >100 |
| 2 | 45 | 0 | 0 | 0 | 0 | B, 5 | 90 | 10 | >100 |
| 3 | 45 | 0 | 0 | 0 | 0 | C, 5 | 90 | 10 | 90 |
| 4 | 45 | 0 | 0 | 0 | 0 | D, 5 | 90 | 10 | <50 |
| 5 | 45 | 0 | 0 | 0 | 0 | E, 5 | 90 | 10 | N.D.* |
| 6 | 45 | 0 | 0 | 0 | 0 | F, 5 | 90 | 10 | N.D. |
| 7 | 45 | 0 | 0 | 0 | 0 | G, 5 | 90 | 10 | N.D. |
| 8 | 45 | 0 | 0 | 0 | 0 | H, 5 | 90 | 10 | N.D. |
| 9 | 45 | 0 | 0 | 0 | 0 | I, 5 | 90 | 10 | N.D. |
| 10 | 22.5 | 0 | 0 | 0 | 0 | A, 2.5 | 90 | 10 | >100 |
| 11 | 19.63 | 0 | 0 | 0 | 2.87 | A, 2.5 | 78.5 | 10 | >100 |
| 12 | 16.53 | 0 | 0 | 0 | 5.97 | A, 2.5 | 66.1 | 10 | >100 |
| 13 | 20.2 | 0 | 0 | 0 | 2.3 | A, 2.5 | 80.8 | 10 | >100 |
| 14 | 16.5 | 0 | 0 | 0 | 6.5 | A, 2 | 66.1 | 8 | >100 |
| 15 | 0 | 22.5 | 0 | 0 | 0 | A, 2.5 | 90 | 10 | >100 |
| 16 | 0 | 22.5 | 0 | 0 | 0 | B, 2.5 | 90 | 10 | >100 |
| 17 | 0 | 0 | 22.5 | 0 | 0 | A, 2.5 | 90 | 10 | >100 |
| 18 | 0 | 0 | 22.5 | 0 | 0 | B, 2.5 | 90 | 10 | >100 |
| 19 | 0 | 0 | 0 | 22.5 | 0 | A, 2.5 | 90 | 10 | >100 |
| 20 | 0 | 0 | 0 | 22.5 | 0 | B, 2.5 | 90 | 10 | <50 |
| 21 | 0 | 41.8 | 0 | 0 | 4.7 | A, 3.5 | 83.7 | 7 | N.D. |
| 22 | 32.0 | 0 | 0 | 0 | 15 | A, 3 | 64 | 6 | N.D. |
| 23 | 32.0 | 0 | 0 | 0 | 13 | A, 5 | 64 | 10 | N.D. |

TABLE IIa-continued

| Concentrate Example No. | IPA Glyphosate Salt (g) | K Glyphosate Salt (g) | K/IPA (40:60) Glyphosate Salt (g) | K/NH$_4$ (45:55) Glyphosate Salt (g) | Water (g) | Surfactant System, Amount (g) | Weight Percent Glyphosate Salt | Weight Percent Surfactant Blend | Cloud Point (° C.) |
|---|---|---|---|---|---|---|---|---|---|
| 24 | 32.0 | 0 | 0 | 0 | 13 | B, 5 | 64 | 10 | N.D. |
| 25 | 32.0 | 0 | 0 | 0 | 14 | I, 4 | 64 | 8 | N.D. |

*N.D. = Not Determined

TABLE IIb

| Concentrate Example No. | IPA Glyphosate Salt (g) | K Glyphosate Salt (g) | K/IPA (40:60) Glyphosate Salt (g) | K/NH$_4$ (45:55) Glyphosate Salt (g) | Water (g) | Surfactant System, Amount (g) | Weight Percent Glyphosate Salt | Weight Percent Surfactant Blend | Cloud Point (° C.) |
|---|---|---|---|---|---|---|---|---|---|
| 26 | 45 | 0 | 0 | 0 | 0 | J, 5 | 90 | 10 | N.D. |
| 27 | 45 | 0 | 0 | 0 | 0 | K, 5 | 90 | 10 | N.D. |
| 28 | 45 | 0 | 0 | 0 | 0 | L, 5 | 90 | 10 | N.D. |
| 29 | 45 | 0 | 0 | 0 | 0 | M, 5 | 90 | 10 | N.D. |
| 30 | 45 | 0 | 0 | 0 | 0 | N, 5 | 90 | 10 | N.D. |
| 31 | 45 | 0 | 0 | 0 | 0 | O, 5 | 90 | 10 | N.D. |
| 32 | 32 | 0 | 0 | 0 | 13 | J, 5 | 64 | 10 | N.D. |
| 33 | 32 | 0 | 0 | 0 | 14 | K, 4 | 64 | 8 | N.D. |
| 34 | 32 | 0 | 0 | 0 | 15 | K, 3 | 64 | 6 | N.D. |
| 35 | 32 | 0 | 0 | 0 | 14 | L, 4 | 64 | 8 | N.D. |
| 36 | 32 | 0 | 0 | 0 | 15 | L, 6 | 64 | 6 | N.D. |
| 37 | 32 | 0 | 0 | 0 | 14 | O, 4 | 64 | 8 | N.D. |
| 38 | 22.5 | 0 | 0 | 0 | 0 | P, 2.5 | 90 | 10 | >100 |
| 39 | 22.5 | 0 | 0 | 0 | 0 | Q, 2.5 | 90 | 10 | >100 |
| 40 | 22.5 | 0 | 0 | 0 | 0 | R, 2.5 | 90 | 10 | >100 |
| 41 | 22.5 | 0 | 0 | 0 | 0 | S, 2.5 | 90 | 10 | >100 |
| 42 | 22.5 | 0 | 0 | 0 | 0 | T, 2.5 | 90 | 10 | >100 |
| 43 | 22.5 | 0 | 0 | 0 | 0 | U, 2.5 | 90 | 10 | >100 |
| 44 | 22.5 | 0 | 0 | 0 | 0 | V, 2.5 | 90 | 10 | >100 |
| 45 | 22.5 | 0 | 0 | 0 | 0 | W, 2.5 | 90 | 10 | >100 |
| 46 | 22.5 | 0 | 0 | 0 | 0 | X, 2.5 | 90 | 10 | >100 |
| 47 | 22.5 | 0 | 0 | 0 | 0 | Y, 2.5 | 90 | 10 | >100 |
| 48 | 22.5 | 0 | 0 | 0 | 0 | Z, 2.5 | 90 | 10 | >100 |
| 49 | 22.5 | 0 | 0 | 0 | 0 | AA, 2.5 | 90 | 10 | >100 |
| 50 | 0 | 41.8 | 0 | 0 | 2.6 | S, 5.6 | 83.7 | 11.2 | N.D. |

Greenhouse Data

Greenhouse trials were performed to evaluate the phytotoxicity enhancement of various surfactant blends and use rates. Selected concentrates from Tables IIa-IIb were applied at two application rates, 90% and 45% of the label rate of Roundup Weather Max®, Roundup Original Max® or Roundup Ultra Max® available from Monsanto Company, St. Louis, Mo. Roundup Weather Max, Roundup Original Max and Roundup Ultra Max were also used at 90% and 45% of the label rate specified for each product. For example, if the Roundup Original Max label directs the use of 32 oz. of product per acre, then each of the formulations made as described above and the Roundup Original Max was used at 90%×32=28.8 oz./acre and at 45%×32=14.4 oz/acre. In this manner, the quantity of glyphosate spread was equivalent in each comparison, and only the amount and type of surfactant varied.

Roundup Weather Max and Roundup Original Max each contain about 540 g a.e./l of the potassium salt of glyphosate. Roundup Ultra Max contains about 360 g a.e./l of the isopropylamine salt of glyphosate. The actual label rate of each product depends on the species of plant one is trying to kill. Different weeds have different susceptibilities to glyphosate, and are required to be treated with different amounts of glyphosate. Roundup Weather Max and Roundup Original Max each contain about 8-10% of a blend of surfactants. Roundup Ultra Max contains about 11-14% of a blend of surfactants. The precise identity of the surfactants has not been disclosed. Regardless of what surfactant is actually used in each product, the purpose of these experiments was to show that the surfactant system of the invention outperforms or is comparable to what is accepted as the industry standard at lower use levels.

Eight plant species were selected for the study. They include (1) Barnyardgrass, (2) Redroot pigweed, (3) Morning glory ivyleaf, (4) Sicklepod, (5) Panicum, (6) Crabgrass, (7) Velvetleaf, and (8) Sunflower. The tests were performed in a randomized complete block design with 5 replicates of each species of plant. Plants were grown in square plastic pots, 3.75 inches×3.75 inches and 3.125 inches deep. Prior to treatment, 5 replicate pots were indiscriminately selected for each treatment and plant species. Treatments were applied as foliar applications. Treatments were applied with a hand pump sprayer equipped with 1 nozzle calibrated to deliver 15 gallons per acre. All spraying tests included a set of 5 untreated control plants from each species.

Figure 2:
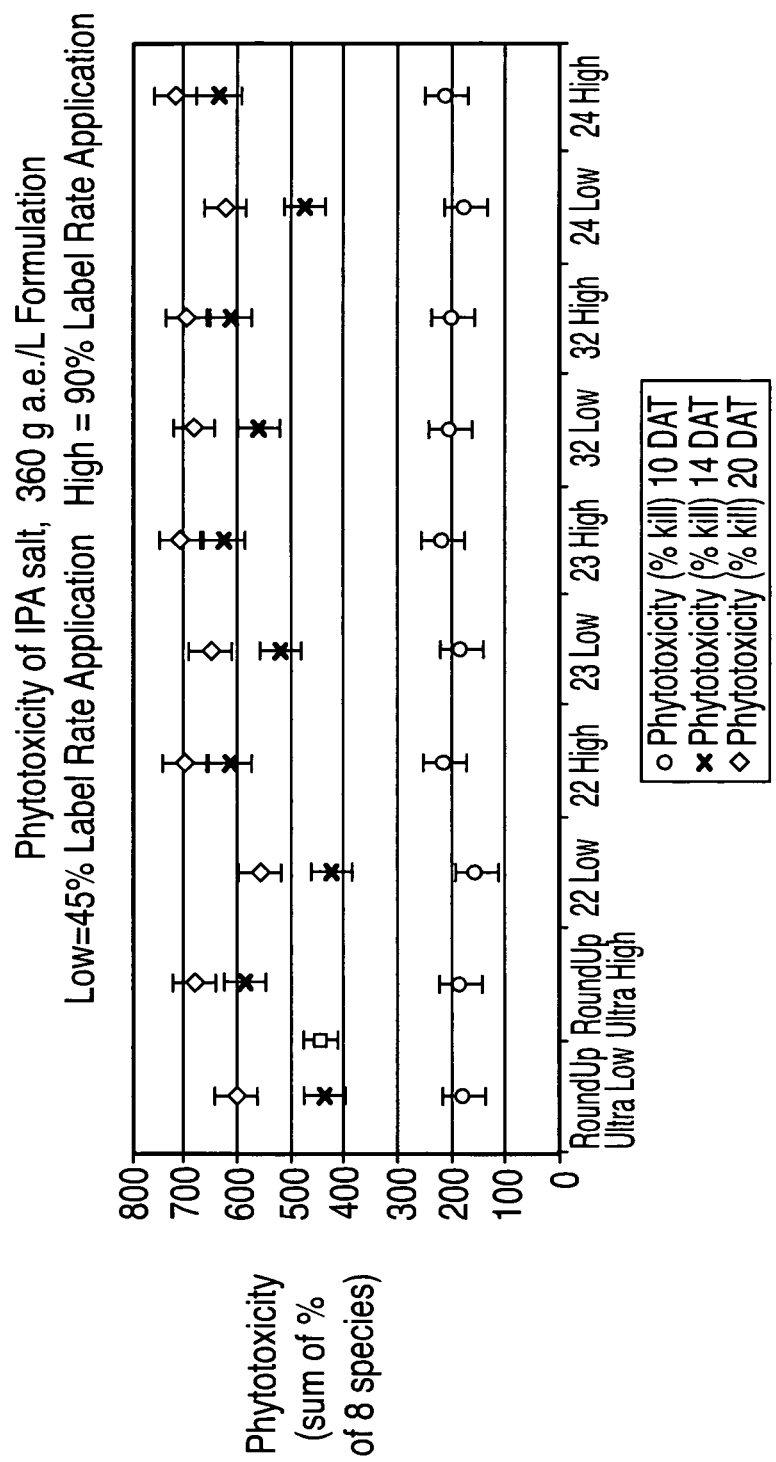
Figure 3:
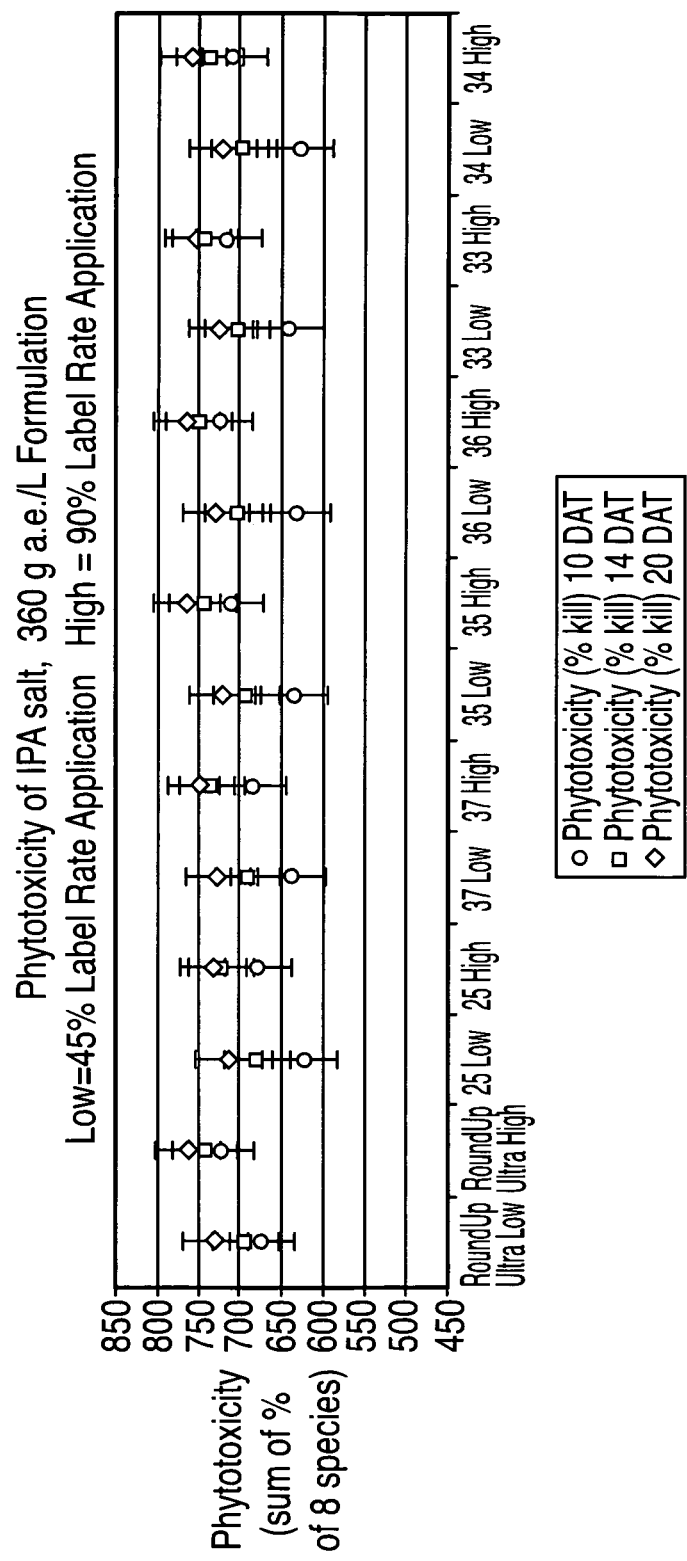

The data from the field trials are graphically depicted in FIGS. 1-3. (Note: the numbers along the x axis of each graph, e.g., "25 low", refers to the corresponding number for each concentrate example appearing in Tables IIa-IIb, e.g., the "25" in "25 low" refers to concentrate example No. 25 in Table IIa. The terms "low and "high" refer to 45% and 90%, respectively, of the label rate of Roundup Weather Max, Roundup Original Max or Roundup Ultra Max). It can readily be seen that the concentrates of the invention exhibit phytotoxicity comparable or superior to the commercial standard formulations, even when the concentration of surfactant in the inventive formulations is lower than that of the commercial formulations.

Comparative Eye Irritation Tests

Glyphosate concentrates of the invention were evaluated for their propensity to cause eye irritation. The eye irritation study involved in this example is a screening test, and employed 3 animals. The study of the present example employed the following protocol:

FHSA/CPSC Design, 16 CFR 1500; Primary Eye Irritation (Modified);
FHSA=Federal Hazardous Substances Act
CPSC=Consumer Product Safety Commission CFR=Code of Federal Register In this screening test, a drop of the glyphosate formulation was placed in rabbits' eyes and the number of animals that experience eye irritation as well as the time it takes for the irritation to clear up and return to normal was recorded. "Tentative Ratings" based on the Draize scale (a scale used for eye irritation with points that may range from 0-110) is as follows:

| | |
|---|---|
| 0.0-0.5 points | Non-irritating |
| 0.5-2.5 pts. | Practically non-irritating |
| 2.5-15 pts. | Minimally irritating |
| 15-25 pts. | Mildly irritating |
| 25-50 pts. | Moderately irritating |
| 50-80 pts. | Severely irritating |
| 80-110 pts. | Extremely irritating to corrosive |

The results of the eye irritation tests are shown in Table IV below.

TABLE IV

| Formulation | Irritation Score/110 | Time for irritation to clear |
|---|---|---|
| Roundup Weather Max | 28.3/110 | 7 days |
| Roundup Original Max | 16.7/110 | 7 days |
| Concentrate Example 50, 11.2% by wt. | 8.3/110 | 7 days |
| IPA glyphosate salt 360 g a.e./l, Surfactant System A 6% by wt. | 8/110 | 3 days |
| IPA glyphosate salt 540 g a.e./l, Surfactant System A 6% by wt. | 8.67/110 | 3 days |
| K/IPA glyphosate salt blend 540 g a.e./l, Surfactant System A 6% by wt. | 9.33/110 | 3 days |
| K glyphosate salt 540 g a.e./l, Surfactant System A 12% by wt. | 8.3/110 | 7 days |

The results show that Concentrate Example 50 and concentrates containing Surfactant System A in combination with the IPA, K/IPA and K salts of glyphosate are less irritating than the commercially available Roundup Weather Max and Roundup Original Max products.

Warm and Cold Temperature Stability Studies of the Surfactant Blends

Samples of Concentrate Example Nos. 1, 2, 15, 16, 17, 18, 19 and 20 were tested for warm and cold temperature stability as follows. For warm temperature stability, a 50.0 gram sample of the glyphosate concentrate was placed in an oven maintained at a temperature of about 54° C. for about 2 weeks. These concentrates did not separate or undergo substantial change in optical clarity over that time period and are therefore deemed to be warm temperature stable.

For cold temperature stability, 50.0 gram samples of Concentrate Example Nos. 1, 2, 15, 16, 17, 18, 19 and 20 were placed in a refrigerator maintained at a temperature of about 2° C. for about 4 weeks. The concentrates did not separate or have precipitates in them. The concentrates were removed from the refrigerator and allowed to equilibrate to room temperature, about 20-25° C. Upon equilibration of the temperature of the samples, no separation or substantial change in the optical clarity of the concentrates occurred.

What is claimed is:

1. An ultra-high load, aqueous glyphosate salt-containing concentrate comprising:
   (a) water;
   (b) glyphosate salt in solution in the water in an amount greater than about 39 weight percent of acid equivalent, based on the weight of the concentrate, said glyphosate salt being selected from the group consisting of the isopropylamine salt of glyphosate, the potassium salt of glyphosate, mixtures of the isopropylamine salt and the potassium salt of glyphosate and mixtures of the potassium salt and the ammonium salt of glyphosate;
   (c) a surfactant system in an amount ranging from about 1 to about 20 weight percent, based on the weight of the concentrate, comprising:
      (i) from about 10 to about 60 weight percent, based on the weight of the surfactant system, of one or more dialkoxylated alkylamines having the formula $R^1\text{-}N(R^2)(R^3)$ 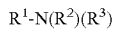

wherein $R^1$ is a $C_8$-$C_{24}$ straight or branched chain, saturated or unsaturated hydrocarbyl group, $R^2$ is an $(AO)_nH$ group and $R^3$ is an $(AO)_{n'}H$ group wherein A represents an alkylene group and n and n' are integers such that n+n' has an average value of from 2 to 20;
      (ii) from about 5 to about 30 weight percent, based on the weight of the surfactant system, of one or more water miscible solubilizers selected from the group consisting of monohydric alcohols, dihydric alcohols, polyhydric alcohols, alkylene glycols and polyalkylene glycols; and
      (iii) from about 30 to about 75 weight percent, based on the weight of the surfactant system, of one or more amine oxides having the formula $R^4R^5R^6N{\to}O$ 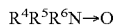

wherein $R^4$ is a $C_8$-$C_{24}$ straight or branched chain, saturated or unsaturated hydrocarbyl group or $R^7CONH(CH_2)_n$, wherein $R^7$ is a $C_8$-$C_{24}$ straight or branched chain, saturated or unsaturated hydrocarbyl group and n is from 1 to 3; $R^5$ and $R^6$ are independently $C_1$-$C_3$ hydrocarbyl groups or substituted $C_1$-$C_3$ hydrocarbyl groups;
   said concentrate having a cloud point above at least 70° C. or no cloud point when the concentrate is heated to its boiling point.

2. The concentrate of claim 1 wherein the glyphosate salt is the isopropylamine salt of glyphosate.

3. The concentrate of claim 1 wherein the glyphosate salt is the potassium salt of glyphosate.

4. The concentrate of claim 1 wherein the glyphosate salt is a mixture of the isopropylamine salt and the potassium salt of glyphosate.

5. The concentrate of claim 1 wherein the glyphosate salt is a mixture of the potassium salt and the ammonium salt of glyphosate.

6. The concentrate of claim 1 wherein the glyphosate salt is in solution in the water in an amount greater than about 43 weight percent of acid equivalent.

7. The concentrate of claim 1 wherein the glyphosate salt is in solution in the water in an amount greater than about 47 weight percent of acid equivalent.

8. The concentrate of claim 1 wherein the surfactant system comprises from about 2 to about 10 weight percent of the concentrate.

9. The concentrate of claim 1 wherein the surfactant system comprises from about 3 to about 8 weight percent of the concentrate.

10. The concentrate of claim 1 wherein the dialkoxylated alkylamine comprises from about 25 to about 45 weight percent of the surfactant system.

11. The concentrate of claim 1 wherein the water miscible solubilizer comprises from about 10 to about 20 weight percent of the surfactant system.

12. The concentrate of claim 1 wherein the amine oxide comprises from about 40 to about 50 weight percent of the surfactant system.

13. The concentrate of claim 1 having no cloud point.

14. The concentrate of claim 1 having a cloud point above 100° C.

15. The concentrate of claim 1 having a cloud point above 90° C.

16. The concentrate of claim 1 having a cloud point above 80° C.

17. The concentrate of claim 1 wherein n+n' for the dialkoxylated alkylamine has an average value of from 2 to 15.

18. The concentrate of claim 1 wherein n+n' for the dialkoxylated alkylamine has an average value of from 5 to 15.

19. The concentrate of claim 1 wherein the dialkoxylated alkylamine is a diethoxylated derivative of cocoamine, tallowamine or oleylamine.

20. The concentrate of claim 1 wherein the dialkoxylated alkylamine is diethoxylated tallow amine.

21. The concentrate of claim 20 wherein the diethoxylated tallow amine possesses an average of from 2 to 20 moles of ethoxy groups.

22. The concentrate of claim 20 wherein the diethoxylated tallow amine possesses an average of from 2 to 15 moles of ethoxy groups.

23. The concentrate of claim 20 wherein the diethoxylated tallow amine possesses an average of from 5 to 15 moles of ethoxy groups.

24. The concentrate of claim 1 wherein the water miscible solubilizer comprises polyalkylene glycol possessing a molecular weight of from about 200 to about 1000.

25. The concentrate of claim 24 wherein the polyalkylene glycol is polyethylene glycol.

26. The concentrate of claim 1 wherein the amine oxide is selected from the group consisting of coconut dimethyl amine oxide, capric/capryllic dimethyl amine oxide, capric dimethyl amine oxide, lauryl dimethyl amine oxide, lauryl/myristyl dimethyl amido propyl amine oxide, and coca dimethyl amido propyl amine oxide.

27. The concentrate of claim 1 further comprising a co-herbicide.

28. A method of controlling unwanted vegetation which comprises applying to the vegetation a water-diluted composition of claim 1.

29. A method of making a glyphosate salt-containing composition which comprises:
(a) providing a glyphosate salt-containing reaction product wherein said glyphosate salt is selected from the group consisting of the isopropylamine salt of glyphosate, the potassium salt of glyphosate, mixtures of the isopropylamine salt and the potassium salt of glyphosate and mixtures of the potassium salt and the ammonium salt of glyphosate; and
(b) contacting the reaction product with a surfactant system while the temperature of said reaction product is at least 70° C. to provide a glyphosate salt-containing composition which possesses a cloud point above at least 70° C., or no cloud point when the composition is heated to its boiling point, said surfactant system comprising:
(i) from about 10 to about 60 weight percent, based on the weight of the surfactant system, of one or more dialkoxylated alkylamines having the formula $$R^1\text{-}N(R^2)(R^3)$$

wherein $R^1$ is a $C_8$-$C_{24}$ straight or branched chain, saturated or unsaturated hydrocarbyl group, $R^2$ is an $(AO)_nH$ group and $R^3$ is an $(AO)_{n'}H$ group wherein A represents an alkylene group and n and n' are integers such that n+n' has an average value of from 2 to 20;
(ii) from about 5 to about 30 weight percent, based on the weight of the surfactant system, of one or more water miscible solubilizers selected from the group consisting of monohydric alcohols, dihydric alcohols, polyhydric alcohols, alkylene glycols and polyalkylene glycols; and
(iii) from about 30 to about 75 weight percent, based on the weight of the surfactant system, of one or more amine oxides having the formula $$R^4R^5R^6N\rightarrow O$$

wherein $R^4$ is a $C_8$-$C_{24}$ straight or branched chain. saturated or unsaturated hydrocarbyl group or $R^7CONH(CH_2)_n$, wherein $R^7$ is a $C_8$-$C_{24}$ straight or branched chain, saturated or unsaturated hydrocarbyl group and n is from 1 to 3; $R^5$ and $R^6$ are independently $C_1$-$C_3$ hydrocarbyl groups or substituted $C_1$-$C_3$ hydrocarbyl groups.

30. The method of claim 29 wherein the reaction product and surfactant system are contacted when the reaction product possesses a temperature of at least about 75° C.

31. The method of claim 29 wherein the reaction product and surfactant system are contacted when the reaction product possesses a temperature of at least about 80° C.

32. The method of claim 29 wherein the glyphosate salt-containing composition is a concentrate comprising glyphosate salt in an amount greater than about 39 weight percent of acid equivalent, based on the weight of the concentrate.

33. The method of claim 29 wherein the glyphosate salt-containing composition is optically transparent at 70° C.

34. The method of claim 29 wherein the glyphosate salt is the isopropylamine salt of glyphosate.

35. The method of claim 29 wherein the glyphosate salt is the potassium salt of glyphosate.

36. The method of claim 29 wherein the glyphosate salt is a mixture of the isopropylamine salt and the potassium salt of glyphosate.

37. The method of claim 29 wherein the glyphosate salt is a mixture of the potassium salt and the ammonium salt of glyphosate.

38. The method of claim 29 wherein n+n' for the dialkoxylated alkylamine has an average value of from 2 to 15.

39. The method of claim 29 wherein n+n' for the dialkoxylated alkylamine has an average value of from 5 to 15.

40. The method of claim 29 wherein the dialkoxylated amine is a diethoxylated derivative of cocoamine, tallowamine or oleylamine.

41. The method of claim 40 wherein the dialkoxylated amine is diethoxylated tallow amine.

42. The method of claim 41 wherein the diethoxylated tallow amine possesses an average of from 2 to 15 moles of ethoxy groups.

43. The method of claim 41 wherein the diethoxylated tallow amine possesses an average of from 2 to 15 moles of ethoxy groups.

44. The method of claim 41 wherein the diethoxylated tallow amine possesses an average of from 5 to 10 moles of ethoxy groups.

45. The method of claim 29 wherein the water miscible solubilizer comprises polyalkylene glycol possessing a molecular weight of from about 200 to about 1000.

46. The method of claim 45 wherein the polyalkylene glycol is polyethylene glycol.

47. The method of claim 29 wherein the amine oxide is selected from the group consisting of coconut dimethyl amine oxide, capric/capryllic dimethyl amine oxide, capric dimethyl amine oxide, lauryl dimethyl amine oxide, lauryl/myristyl dimethyl amido propyl amine oxide, and coca dimethyl amido propyl amine oxide.

* * * * *